United States Patent
Dickens et al.

(10) Patent No.: US 10,069,926 B2
(45) Date of Patent: *Sep. 4, 2018

(54) CRITERIA-BASED DATA PUSH (71) Applicant: International Business Machines Corporation, Armonk, NY (US)

(72) Inventors: Louie A. Dickens, Tucson, AZ (US); Mark S. Fleming, Oro Valley, AZ (US); Michael T. Gray, Austin, TX (US); George B. Markos, Wallkill, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 215 days.

This patent is subject to a terminal disclaimer.

(21) Appl. No.: 14/851,406

(22) Filed: Sep. 11, 2015

(65) Prior Publication Data

US 2017/0078424 A1     Mar. 16, 2017

(51) Int. Cl.
  *G06F 15/16*   (2006.01)
  *H04L 29/08*   (2006.01)
  *G06F 9/455*   (2018.01)
  *G06F 9/50*    (2006.01)
  *H04L 12/26*   (2006.01)

(52) U.S. Cl.
  CPC .......... *H04L 67/26* (2013.01); *G06F 9/45533* (2013.01); *G06F 9/50* (2013.01); *H04L 43/08* (2013.01); *H04L 43/0876* (2013.01); *H04L 67/125* (2013.01)

(58) Field of Classification Search
  CPC ..... H04L 67/26; H04L 43/08; G06F 9/45533; G06F 9/50
  USPC ........................................................ 709/219
  See application file for complete search history.

(56) References Cited

U.S. PATENT DOCUMENTS

| 8,606,923 | B2 | 12/2013 | Tekwani |  |
| 2010/0174756 | A1* | 7/2010 | Lazaridis | G06Q 30/00 707/802 |
| 2013/0067035 | A1 | 3/2013 | Amanat et al. |  |
| 2015/0331775 | A1* | 11/2015 | Slik | G06F 11/008 714/6.23 |

OTHER PUBLICATIONS

List of IBM Patents or Patent Applictions Treated as Related; (Appendix P), Date Filed Aug. 24, 2016; 2 pages.

(Continued)

*Primary Examiner* — Alan S Chou
(74) *Attorney, Agent, or Firm* — Cantor Colburn LLP (57) ABSTRACT

Embodiments relate to criteria-based data push. An aspect includes receiving, by a criteria request server, a data push request from a user, the data push request specifying criteria for particular data to be pushed and a user device to receive the particular data. Another aspect includes forwarding the data push request to an incoming data monitor. Another aspect includes monitoring, by the incoming data monitor, incoming data received from one or more content providers. Yet another aspect includes, based on detecting the particular data that is specified by the data push request in the incoming data by the incoming data monitor, pushing the particular data to the user device.

11 Claims, 4 Drawing Sheets

(56) References Cited

OTHER PUBLICATIONS

U.S. Appl. No. 15/245,414, filed Aug. 24, 2016 Entitled: Criteria-Based Data Push.
List of IBM Patents or Patent Applictions Treated as Related; (Appendix P), Date Filed Jul. 8, 2016; 2 pages.
U.S. Appl. No. 15/067,675, filed Mar. 11, 2016; Entitled: Criteria-Based Data Push.

* cited by examiner

CRITERIA-BASED DATA PUSH

BACKGROUND

The present invention relates generally to cloud computing, and more specifically, to criteria-based data push.

A cloud computing environment is an enhancement to the predecessor grid environment, whereby multiple grids and other computation resources may be further abstracted by a cloud layer, thus making disparate devices appear to an end-user as a single pool of seamless resources. These resources may include such things as physical or logical compute engines, servers and devices, device memory, and storage devices.

SUMMARY

Embodiments include a method, system, and computer program product for criteria-based data push. An aspect includes receiving, by a criteria request server, a data push request from a user, the data push request specifying criteria for particular data to be pushed and a user device to receive the particular data. Another aspect includes forwarding the data push request to an incoming data monitor. Another aspect includes monitoring, by the incoming data monitor, incoming data received from one or more content providers. Yet another aspect includes, based on detecting the particular data that is specified by the data push request in the incoming data by the incoming data monitor, pushing the particular data to the user device.

BRIEF DESCRIPTION OF THE DRAWINGS

The subject matter which is regarded as embodiments is particularly pointed out and distinctly claimed in the claims at the conclusion of the specification. The forgoing and other features, and advantages of the embodiments are apparent from the following detailed description taken in conjunction with the accompanying drawings in which:

DETAILED DESCRIPTION

Embodiments of criteria-based cloud push are provided, with exemplary embodiments being discussed below in detail. A content provider may send data straight to the cloud as it is created by software and/or hardware of the content provider. Criteria-based cloud push enables the pushing of cloud data in real time to a user device based on criteria that are specified by the user. Incoming data from content providers is monitored, and, based on detection of a match with user-specified push criteria, the matching data is automatically pushed to the requesting user.

In some embodiments, the requested data may be pushed to multiple remote devices from the cloud via a network or cellular connection. Real time viewing of requested data, as specified by the user, is enabled on a user device. Pushed data may include any appropriate cloud data, including but not limited to sports-related data such as scoreboards, a countdown until an event, school classroom data so that, for example, a remote student may attend a class (may be linked into a smart board so remote student can work through examples with the class). Further, content providers such as cable providers or broadcast stations may upload programming tot eh cloud, and requested programming may be automatically pushed to a user, allowing a consumer to pay a subscription to the broadcast station and receive only the programming they want.

A user wishing to have data pushed to one or more user devices may use an application on their computer or mobile device to define the data push criteria. The data push criteria may specify, for example, a particular content provider, and/or a name of particular content. The application communicates the push criteria to a data request criteria server. In some embodiments, the data request criteria server may format the request as a cloud command, for example, a specialized cloud data management interface (CDMI) command. The data criteria request server may be inside or outside the cloud in various embodiments. The CDMI command is then communicated from the data criteria request server to an incoming data monitor in the cloud, which monitors incoming data from content providers as it is received by the cloud for data that matches the criteria. When incoming data matches the data push criteria, the matching data is pushed out using a push service. The incoming data monitor may monitor the incoming data for any appropriate number of data push criteria simultaneously.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 1:
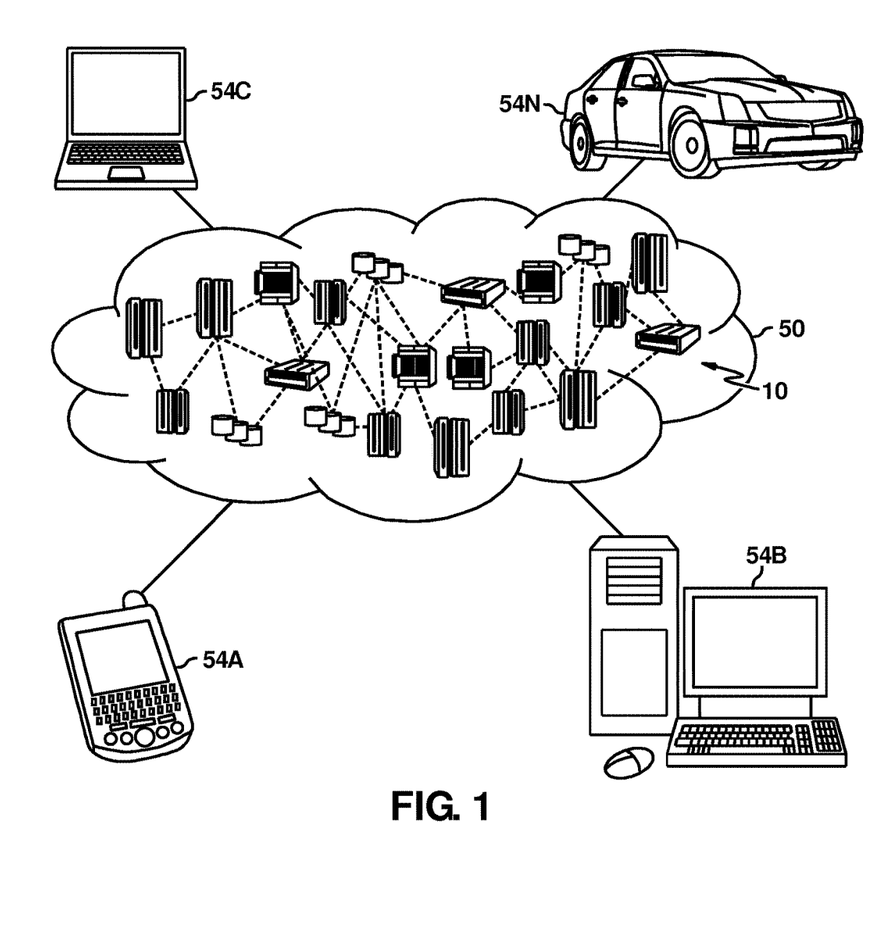
FIG. 1 depicts a cloud computing environment according to an embodiment of the present invention.

Referring now to FIG. 1, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
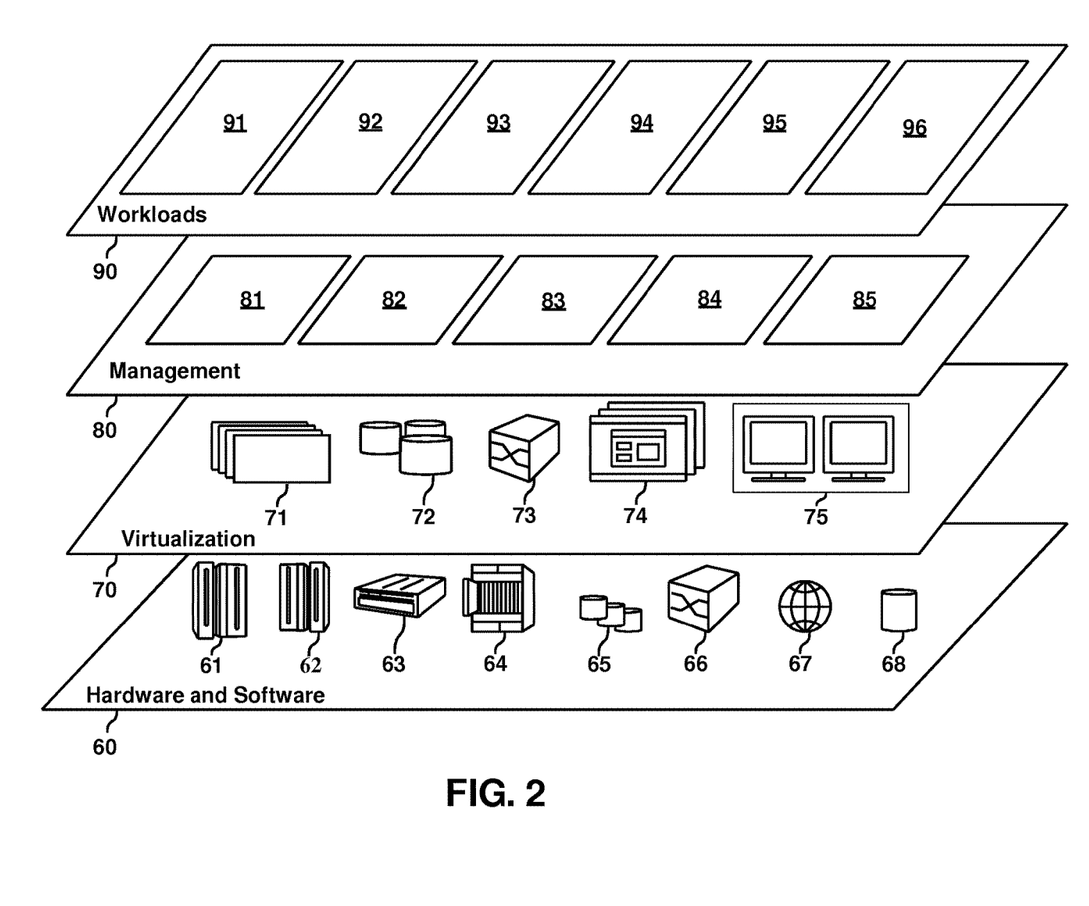
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and criteria-based data push 96.

Figure 3:
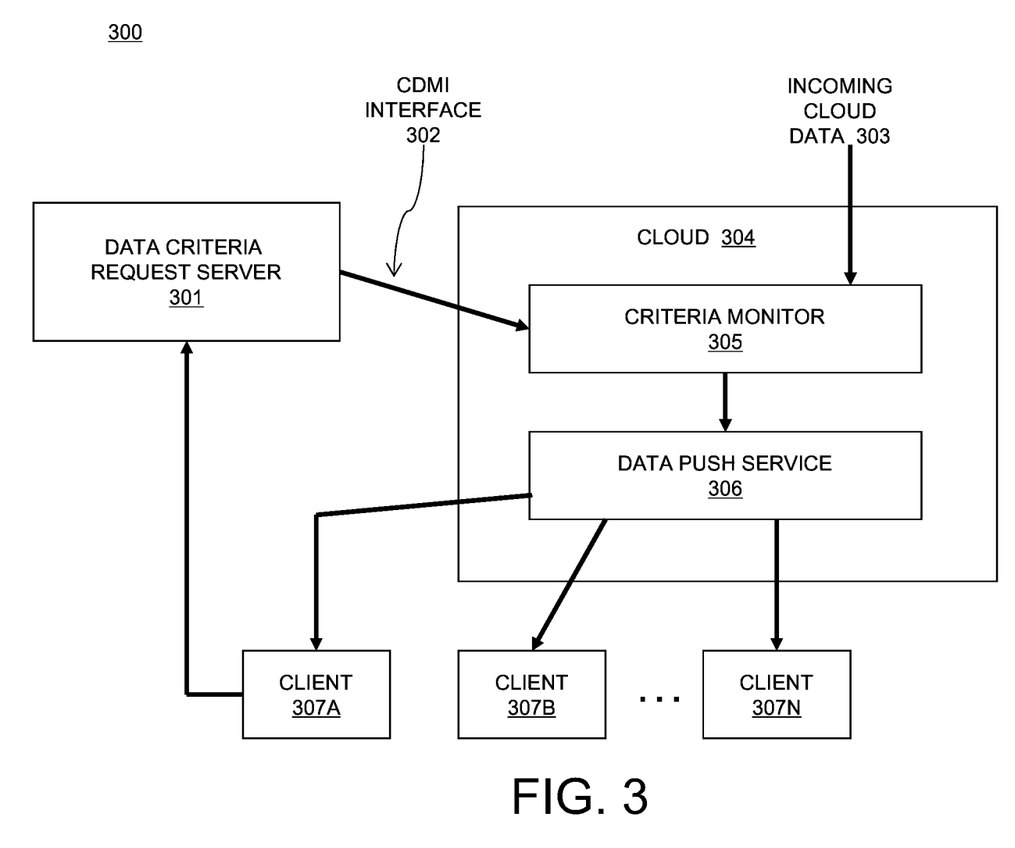
FIG. 3 depicts a system for criteria-based data push in accordance with an embodiment.

FIG. 3 illustrates an embodiment of a system 300 for criteria-based data push, which may be implemented in a cloud computing environment as discussed above with respect to FIGS. 1 and 2. i.e., cloud 304 may comprise cloud computing environment 50, and clients 307A-N may comprise cloud consumers, such as, for example, personal digital assistant (PDA) or cellular telephone 54A, desktop computer 54B, laptop computer 54C, and/or automobile computer system 54N. In system 300, a data criteria request server receives requests for push data from clients, such as client 307A of clients 307A-N. A user may configure a request using an application running on the requesting client 307A. The request may be directed to any appropriate type of data that is stored in the cloud 304. The request may describe data from appropriate content provider, for example, based on a name of a content provider and/or a name of data. In some embodiments, the application may provide a list of available data to the user, and the user may select data from the list for pushing. The request may further designate one or more user devices, for example any of clients 307A-N, to receive the push data. A single request may designate multiple user devices to receive the same push data in some embodiments. A user may also disable or edit the criteria of a push request via the application. The data criteria request server 301 formats the request as a cloud command, which may be, for example, a CDMI command, and sends the CDMI command via CDMI interface 302 to criteria monitor 305 in the cloud 304. Any data that is already stored in the cloud 304 may be pushed to a requesting client based on a CDMI command that is received from data criteria request server 301. Further, incoming cloud data 303, which may comprise any data that is uploaded to the cloud 304 from one or more content providers, is monitored by criteria monitor 305 for data that matches any active push requests. The criteria monitor 305 may simultaneously monitor the incoming cloud data 303 for data matching a plurality of different active push requests. When data is detected in incoming cloud data 304 that matches an active push request by criteria monitor 305, the data push service 306 is notified. Data push service 306 pushes requested data to the requesting client(s) of clients 307A-N.

Figure 4:
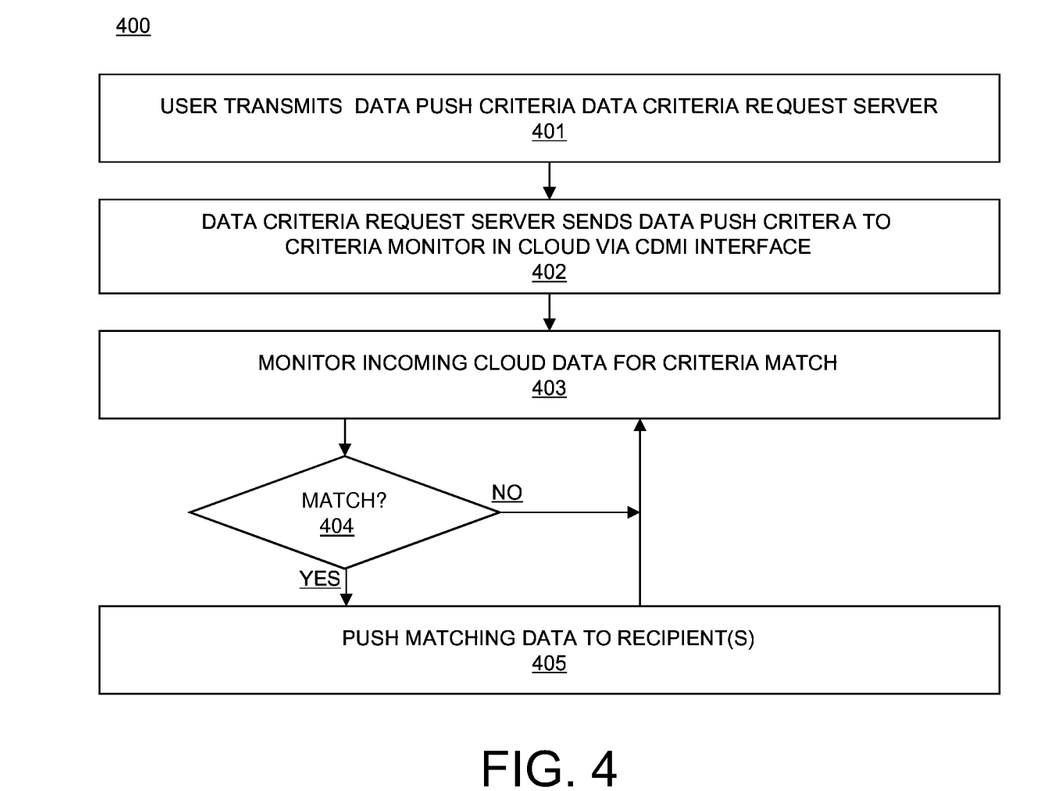
FIG. 4 depicts a process flow for criteria-based data push in accordance with an embodiment.

FIG. 4 illustrates an embodiment of a method 400 for criteria-based data push. FIG. 4 is discussed with respect to FIG. 3. First, in block 401, a user transmits a request for pushing of data that matches particular criteria from a client (such as client 307A) to a data criteria request server 301. The request may be directed to any appropriate type of data that is stored in the cloud 304. The request may describe data from appropriate content provider, for example, based on a name of a content provider and/or a name of data. In some embodiments, the application may provide a list of available data to the user, and the user may select data from the list for pushing. The request may further designate one or more user devices, for example any of clients 307A-N, to receive the push data. A single request may designate multiple user devices to receive the same push data in some embodiments. A user may also disable or edit the criteria of a push request via the application.

In block 402, the data criteria request server 301 formats the request as a cloud command, which may be, for example, a CDMI command, and, forwards the CDMI command to a criteria monitor 305 in cloud 304. In block 403, the criteria monitor 305 monitors incoming cloud data 303, which is received from one or more content providers, for data that matches the criteria in the CDMI command that was received in block 402. If there is no match in block 404, flow returns to block 403, the monitoring by criteria monitor 305 continues. If there is a match in block 404, the criteria monitor 305 notifies the data push service 306, and the data that matches the criteria is pushed to the requesting client, and flow returns to block 403. In some embodiments, the client may request that the push request be disabled, in which case the monitoring of block 403 for the particular push request is ended. Any number of users may have any number of active push requests active at the same time; each push request is handled according to method 400. The criteria of a particular push request may also be edited by the user via the application on the user's device.

Technical effects and benefits include automatic provision of desired data to a user in a cloud-based computing environment.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer implemented method for criteria-based data push, the method comprising:
   receiving, by a criteria request server, a data push request from a user, the data push request specifying criteria for particular data to be pushed and a user device to receive the particular data, wherein the data push request specifies a plurality of user devices to receive the particular data, and wherein the particular data is pushed to the plurality of user devices;
   formatting, by the criteria request server, the data push request as a cloud data management interface (CDMI) command;
   forwarding the data push request to an incoming data monitor, wherein forwarding the data push request to the incoming data monitor comprises forwarding the CDMI command;
   monitoring, by the incoming data monitor, incoming data received from one or more content providers; and
   based on detecting the particular data that is specified by the data push request in the incoming data by the incoming data monitor, pushing, via a push service, the particular data to the user device, wherein pushing the particular data to the user device comprises notifying the push service by the incoming data monitor.

2. The method of claim 1, wherein the data push request is received from an application running on the user device.

3. The method of claim 1, wherein the incoming data monitor simultaneously monitors the incoming data for a plurality of data push requests.

4. The method of claim 1, further comprising receiving, by the criteria request server, a request to modify the data push request, and forwarding, by the criteria request server, the request to modify the data push request to the incoming data monitor.

5. The method of claim 1, wherein the incoming data monitor simultaneously monitors the incoming data for a plurality of data push requests.

6. A computer program product for implementing criteria-based data push, the computer program product comprising:
   a computer readable storage medium having program instructions embodied therewith, the program instructions readable by a processing circuit to cause the processing circuit to perform a method comprising:
      receiving, by a criteria request server, a data push request from a user, the data push request specifying criteria for particular data to be pushed and a user device to receive the particular data, wherein the data push request specifies a plurality of user devices to receive the particular data, and wherein the particular data is pushed to the plurality of user devices;

formatting, by the criteria request server, the data push request as a cloud data management interface (CDMI) command;

forwarding the data push request to an incoming data monitor, wherein forwarding the data push request to the incoming data monitor comprises forwarding the CDMI command;

monitoring, by the incoming data monitor, incoming data received from one or more content providers; and based on detecting the particular data that is specified by the data push request in the incoming data by the incoming data monitor, pushing, via a push service, the particular data to the user device, wherein pushing the particular data to the user device comprises notifying the push service by the incoming data monitor.

7. The computer program product of claim 6, wherein the data push request is received from an application running on the user device.

8. The computer program product of claim 6, further comprising receiving, by the criteria request server, a request to modify the data push request, and forwarding, by the criteria request server, the request to modify the data push request to the incoming data monitor.

9. A computer system for criteria-based data push, the system comprising:

a memory; and a processor, communicatively coupled to said memory, the computer system configured to perform a method comprising:

receiving, by a criteria request server, a data push request from a user, the data push request specifying criteria for particular data to be pushed and a user device to receive the particular data, wherein the data push request specifies a plurality of user devices to receive the particular data, and wherein the particular data is pushed to the plurality of user devices;

formatting, by the criteria request server, the data push request as a cloud data management interface (CDMI) command;

forwarding the data push request to an incoming data monitor, wherein forwarding the data push request to the incoming data monitor comprises forwarding the CDMI command;

monitoring, by the incoming data monitor, incoming data received from one or more content providers; and based on detecting the particular data that is specified by the data push request in the incoming data by the incoming data monitor, pushing, via a push service, the particular data to the user device, wherein pushing the particular data to the user device comprises notifying the push service by the incoming data monitor.

10. The system of claim 9, wherein the data push request is received from an application running on the user device.

11. The system of claim 9, wherein the incoming data monitor simultaneously monitors the incoming data for a plurality of data push requests.

* * * * *